Dec. 2, 1958  A. D. SINDEN  2,862,603
MULTI-UNIT MOVING SIDEWALK
Filed Nov. 28, 1955  2 Sheets-Sheet 1
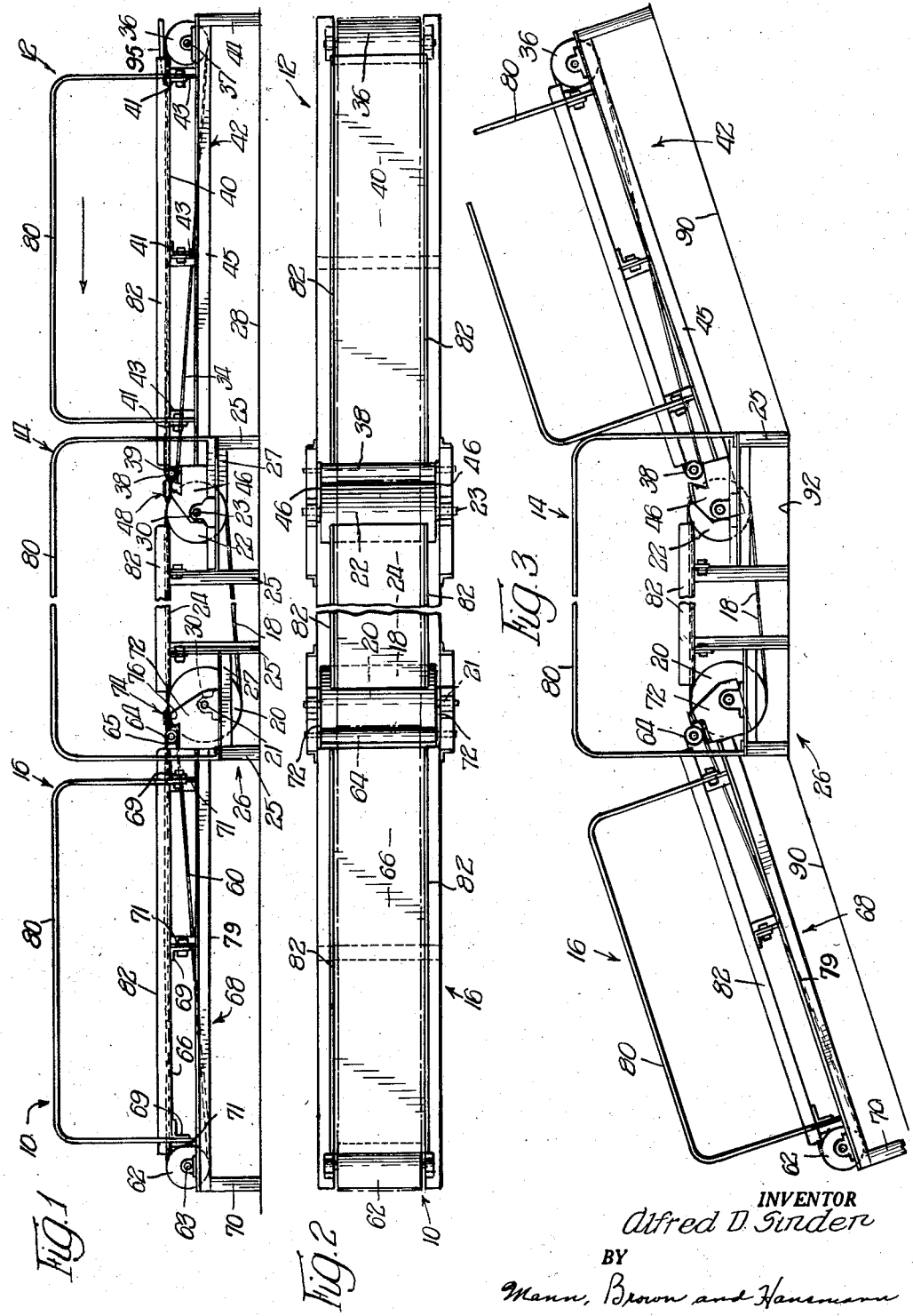
INVENTOR
Alfred D. Sinden
BY
Mann, Brown and Hausmann
Attys

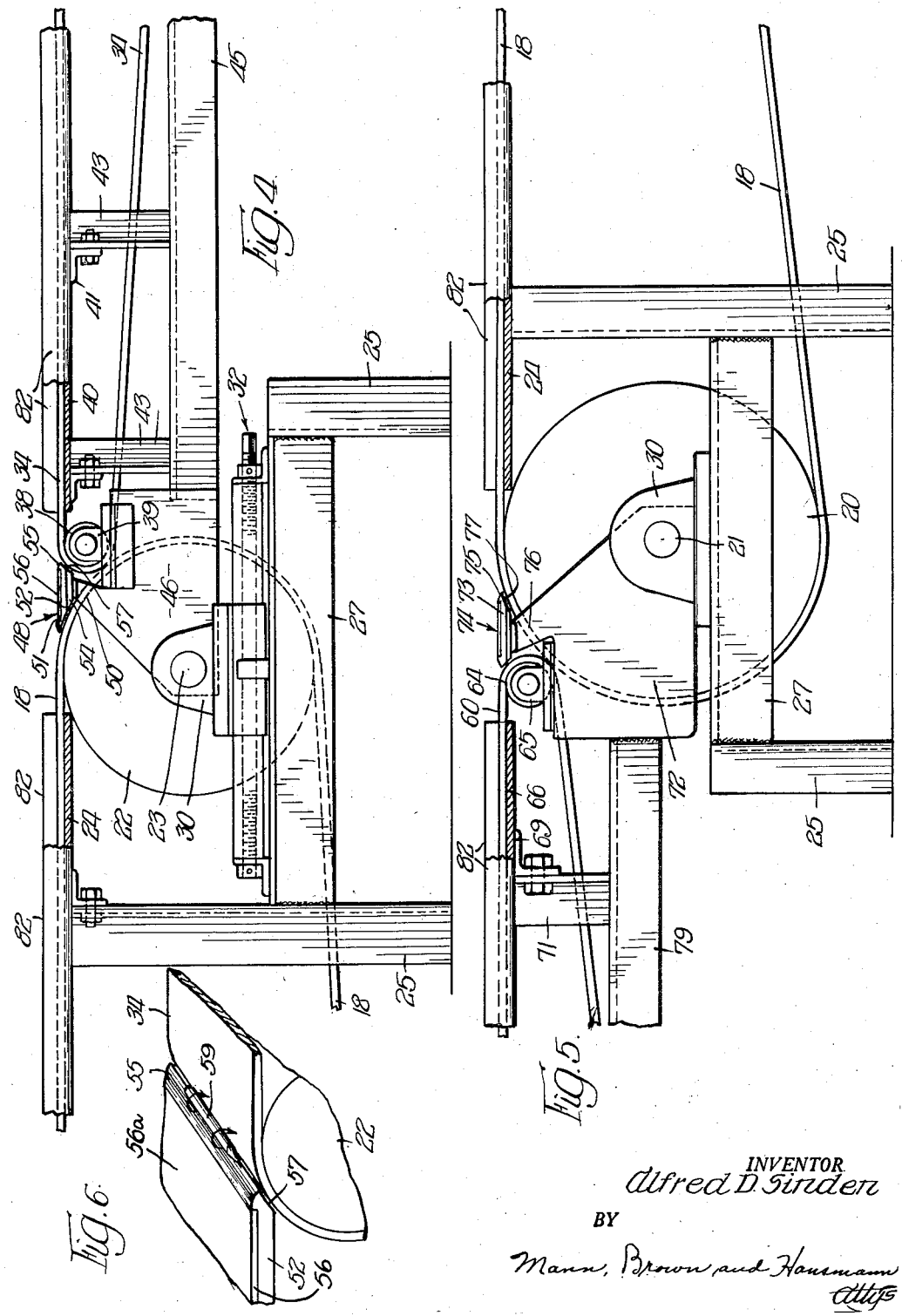

United States Patent Office 2,862,603
Patented Dec. 2, 1958

2,862,603

MULTI-UNIT MOVING SIDEWALK

Alfred D. Sinden, Aurora, Ill., assignor to Stephens-Adamson Mfg. Co., a corporation of Illinois Application November 28, 1955, Serial No. 549,291

9 Claims. (Cl. 198—94)

My invention relates to a high speed moving sidewalk and end landings or auxiliary conveyors therefor, and more particularly to a high speed moving sidewalk including auxiliary low speed conveyors or landings at the ends thereof which, if desired, may be angularly adjustable with respect to the passenger support tread of the high speed moving sidewalk.

There has been much work in recent years in the development of moving sidewalk apparatus that will continuously load, transport, and unload passengers on the scale required to cope with rush hour congestion in populous centers. To meet present day demands, moving sidewalks must move fast enough to keep passenger loading and unloading ramps clear of congestion, and yet the apparatus must be so arranged that passengers can and will board and leave same with ease and confidence.

Moving sidewalks of prior practices have been limited in their speed by the inability of the average person to step from a fixed station or passenger ramp to a belt moving away from him at a speed which is high enough to be satisfactory from a mass transportation standpoint.

One way of increasing the speed of operation of moving sidewalks is to employ auxiliary low speed loading and unloading conveyors interposed between the various passenger loading and unloading stations and the main transporting elements of the apparatus, whereby the passenger is brought up to speed in safe, easy to negotiate, increments. Experience has demonstrated that passengers may safely board a moving sidewalk from a stationary loading platform or ramp, or vice versa, or step from a slowly moving conveyor to a high speed conveyor, or vice versa, when the passenger transfers from one to the other in the direction of travel of the conveyor or conveyors, and the differential in speed of the elements comprising the apparatus does not exceed one and one half miles per hour.

The present invention relates to moving sidewalk apparatus employing auxiliary loading and unloading conveyors at the ends thereof, as distinguished from the sides thereof.

It is a principal object of the present invention to provide moving sidewalk apparatus which moves at a sufficiently high speed to satisfy mass transportation requirements, which employs the above mentioned safe speed increments and manner of transferring between the apparatus elements, and which comprises few and simple, easily assembled components.

Another object of the invention is to provide a high speed moving sidewalk comprising a high speed belt conveyor forming the main high speed element thereof, and low speed belt conveyors positioned at the passenger receiving and delivering ends of the high speed belt conveyors, with safety foot guards spanning the gaps between the respective belts for insuring that the passengers safely and expeditiously pass between the respective conveyors.

A further object of the invention is to provide a novel safety guard adapted to be positioned in the gap formed by disposing two belt conveyors end to end and adjacent each other.

Still a further object of the invention is to provide a moving sidewalk comprising a plurality of aligned belt conveyors in which the gap between the passenger tread surfaces of the respective conveyors is reduced to a minimum by the use of special pulleys at adjacent ends, and in which a resilient rubber-like safety guard, having substantially the same or higher frictional characteristics than the material forming the respective conveyor belts, closes the remainder of the gap.

Yet another object of the invention is to provide moving end landings or loading and unloading conveyors for a high speed moving sidewalk which may be adjusted both as to inclination and lengthwise positioning without disturbing their operating position with respect to the ends of the high speed moving sidewalk.

In accordance with an illustrated embodiment of the invention, I provide a high speed moving sidewalk comprising a relatively long high speed conveyor belt and a relatively short conveyor belt mounted closely adjacent each end of the high speed belt. By making the low speed belts relatively short and thus permitting the use of relatively thin belting, small pulleys may be employed at the ends thereof positioned adjacent the ends of the high speed belt, thus materially reducing the gap between the transport surfaces of the respective belts. A safety foot guard or landing of rubber-like material having frictional characteristics that are substantially equal to or greater than the frictional characteristics of the respective conveyor belts is interposed in the remaining gap. Preferably, the arrangement and proportions are such that the gaps and the safety guards spanning same are spanned by a passenger's foot as he passes between conveyors, thus preventing him from coming to a full stop in transferring from belt to belt.

The respective low speed belts may be mounted for pivotal movement about an axis coinciding with the axis of rotation of the adjacent high speed conveyor end pulley and said foot guards are secured to the respective supports on which the low speed conveyors are mounted. The arrangement of the illustrated embodiment is such that the low speed conveyors may be inclined with respect to the high speed conveyor if a particular installation requires this, and in so doing, the resilient foot guards in the gaps separating the passenger support tread of the high and low speed conveyors remain in the most desirable operating position in spite of the fact that the low speed conveyors are not level with the high speed conveyor.

Other objects, uses and advantages will be obvious or become apparent from a consideration of the following description and drawings.

In the drawings:

Figure 1 is a side elevational view of one embodiment of the invention, with parts broken away;

Figure 2 is a plan view thereof, with parts broken away and the various conveyor belts shown in the broken lines for clarity of illustration;

Figure 3 is a side elevational view of the apparatus shown in Figure 1, showing the low speed conveyors inclined with respect to the high speed conveyor;

Figure 4 is a fragmental elevational view on a larger scale of the right hand end of the high speed conveyor as shown in Figure 1;

Figure 5 is a fragmental elevational view on a larger scale of the left hand end of the high speed conveyor as shown in Figure 1; and Figure 6 is a fragmental perspective view illustrating the cooperation between the safety foot guard or landing herein disclosed and one of the conveyor belts.

Referring now more particularly to Figures 1 and 2 of the drawings, reference numeral 10 generally designates one form of my improved high speed moving sidewalk which comprises an auxiliary low speed loading conveyor generally indicated at 12, a high speed conveyor 14 extending most of the distance between loading and unloading stations, and an auxiliary low speed unloading conveyor generally indicated at 16. The conveyors 12, 14, and 16 each present a relatively smooth transport surface moving in a forward direction.

The illustrated high speed conveyor 14 comprises a relatively long endless belt 18 trained over the necessarily large head and tail pulleys 20 and 22 fixed to shafts 21 and 23 rotatably mounted on either side of an elongate slider plate 24, with the upper run of conveyor belt 18 being in sliding contact with the slider plate 24. The slider plate 24 and pulleys 20 and 22 may be secured to and mounted on upright bars 25 and cross bars 27 forming a simplified support, generally indicated at 26, adapted to be readily assembled and disassembled without requiring modification of the supporting surface 28. Suitable supplementary supports and braces may be employed as necessary and desirable. Preferably, but not necessarily, only two pulleys are employed in the high speed conveyor 14 with the tail pulley 22 being mounted for adjustable movement lengthwise of the belt 18 to provide the necessary tension in the belt. The shafts 21 and 23 are rotatably mounted in bearings 30 secured to cross bars 27, and, as shown in Figure 4, the bearings 30 in which the pulleys 22 are rotatably mounted are screw threadedly engaged with the rotatable worm generally indicated at 32. While the bearings may be of any suitable type and may be adjustably mounted in any suitable manner, I prefer to employ the protected screw take up "Sealmaster" bearings manufactured by Stephens-Adamson Mfg. Co., of Aurora, Illinois. Since the adjustable bearings per se form no part of this invention, further description thereof is believed unnecessary.

The low speed loading conveyor 12 comprises a relatively short and thin endless belt 34 trained over head and tail pulleys 36 and 38 rotatably mounted in suitable bearings 37 and 39 on either side of slider plate 40, with the upper run of the belt 34 being in sliding contact with the plate 40. The slider plate 40 and pulleys 20 and 22 may be mounted on the suitable supplemental, auxiliary, or end frame generally indicated at 42 including transverse bars 41, secured between uprights 43, to which slider plate 40 is connected, and interconnecting longitudinally extending cross bars 45 having legs 44 fixed to one end thereof. If desired, these elements may form a separate, portable unit. The other end of the frame 42 is supported by shaft 23, said shaft 23 passing through plates 46 (see Figure 4) fixed on each side of frame 42, to which bearings 39 are secured. Suitable bearings (not shown) may be interposed between the plates 46 and the shaft 23, and since this end of the frame is supported solely by shaft 23, the frame 42, and therefore low speed conveyor 12, may be pivoted as a unit about an axis passing through, or coinciding with, the axis of shaft 23.

As shown in Figure 4, the tail pulley 38 of the low speed conveyor 12 is preferably of a relatively small diameter, thereby materially reducing the gap between the upper runs of conveyor belts 18 and 34, and a double edge resilient foot or safety guard or landing 48, fixed to arms 50 formed on plates 46, or otherwise secured to the frame 42, covers, or is interposed in, the remaining gap between the upper runs of these conveyors. The foot guard 48 may comprise a strip 52 of rubber-like material secured to a bar 54 fixed between and to arms 50 of plates 46 by screws or the like passing through a relatively thin metal plate 56 embedded in strip 52 and having a smooth upper surface 56a, with the edges of the strip 52 being shaped as shown in Figure 4, thus adapting the strip 52 to be positioned adjacent the curved portions of belts 18 and 34 and in substantial wiping engagement therewith.

The relatively small gap between conveyor belts 18 and 34 provided by this arrangement is of special significance. The resilient foot guard 48 not only fills the gap between the adjacent ends of belts 18 and 34, but the gap and the foot guard are preferably narrow enough for a passenger's foot to span this gap, thus preventing him from coming to a full stop in transferring from belt to belt. Since the high speed belt 18 is relatively long, it must be relatively thick and large end pulleys are required at its terminals. However, since the low speed conveyor belt 34 is relatively short, it may be relatively thin and relatively small end pulleys may be employed. This permits the pulley 38 to be of minimum diameter so that when the passenger delivering end of belt 34 is positioned adjacent the passenger receiving end of belt 34 as shown in Figure 4, the gap between the belts will be of minimum distance lengthwise of the moving sidewalk. By making the pulley 38 as small as possible, the foot guard 48 will be of minimum measurement lengthwise of the moving sidewalk, a smooth transfer surface between belts is provided, and yet a passenger's foot will span from belt to belt.

Moreover, I prefer to form the strip 52 comprising the foot guard 48 out of a material that has frictional characteristics substantially equal to or greater than the frictional characteristics of the material out of which belts 18 and 34 are formed. In other words, the coefficient of friction between the belt transport surface and the strip 52 is substantially 1 or less. Thus, when, for instance, a passenger's shoestrings or trailing garments approach and come into contact with the edge 55 and the surface 57 of strip 52, they are not carried around end pulley 38 by the belt 34 for the reason that friction between such articles and the strip 52 opposes and overcomes the tendency of belt 34 to draw them past the strip 52. Since the surface 57 is in substantial wiping engagement with the adjacent surface of belt 34, these trailing articles immediately come into contact with the strip 52 as they approach the gap between the belts 18 and 34 and tend to turn over and over rather than be pulled past strip 52. As the strip 52 is resilient, they may be readily pulled from between the strip 52 and belt 34 in the event any portion of them passes between these elements during this turning action.

This is diagrammatically illustrated in Figure 6 wherein an object such as pencil 59 will be turned over and over in the direction of the arrows rather than be drawn between strip 52 and belt 34. It will be noted from Figures 4 and 6 that the ends of the strip 52 are at an acute angle with respect to the transport surface of the adjacent belts, and that edge 55 is a relatively pointed edge projecting in a rearward direction. Thus, as a relatively small object, such as a shoestring, contacts the strip 52 and starts to enter the gap between the strip 52 and the transport surfaces, the edge 55 tends to be deflected away from the transport surface rather than toward it. Thus the article is held between the strip and the transport surface only by the bending stresses in the strip, and not by compressive forces, such as those that would be applied if the edge 55 were deflected toward the transport surface. The article may therefore be easily removed by a light pulling action on it.

The low speed unloading conveyor 16 is arranged in a similar manner. It comprises a relatively short endless belt 60 trained over head and tail pulleys 62 and 64 rotatably mounted in suitable bearings 63 and 65, on either side of slider plate 66, with the upper run of the belt 60 being in sliding contact with the plate 66. The slider plate 66 and pulleys 62 and 64 may be mounted on the supplemental, auxiliary, or end frame generally indicated at 68 including transverse bars 69 secured between uprights 71 to which slider plate 66 is connected, and interconnecting, longitudinally extending cross bars 79 having legs 70 fixed at one end thereof, these elements forming a separate portable unit, if so desired. The other end of the frame 68 is supported by shaft 21, said shaft 21 passing through the plates 72, on which bearings 65 are supported, fixed on each side of frame 68. Suitable bearings (not shown) may be interposed in between the plates 72 and the shaft 21 as in the case of the loading conveyor 14. The unloading conveyor is therefore mounted for pivotal movement about the axis of shaft 21.

As in the case of the loading conveyor 12, the tail pulley 64 is of a relatively small diameter, thereby reducing the gap between the upper runs of conveyors 18 and 60, and a double edge resilient foot guard 74, similar to guard 48, is fixed to arms 76 formed on plates 72, or otherwise secured to frame 68, is interposed in the remaining gap. Strip 73 of guard 74, similar to strip 52, preferably is formed from material having substantially the same or higher frictional characteristics than the material from which belts 18 and 60 are formed. The cooperation of edge 75 and surface 77 of this strip 73 with the adjacent surface of belt 18 to prevent shoestrings and the like from being taken around end pulley 20 is the same as that described in connection with strip 52.

The conveyor frames may be provided with suitable hand rails 80 fixed to the respective conveyor frames in any desirable manner, or any of the other conventional devices commonly provided for insuring comfort and safety of the passengers. The slider plates 24, 40, and 66 may be provided with upturned edges 82 for preventing drift of the respective endless belts.

In use, the high speed conveyor will ordinarily be of a length to span much of the distance between loading and unloading stations. The loading and unloading conveyors at the ends of the high speed conveyor may be positioned level, or substantially level therewith as shown in Figure 1, or they may be inclined downwardly or upwardly not more than fifteen degrees. Since in any one installation it is desirable to have the high speed conveyor extend over as much of the distance between end stations as possible, adjustable low speed conveyors or end landings 12 and 16 may be positioned over or upon existing inclined ramp ways that are commonly found in railway stations, convention halls and the like. The elements forming the moving sidewalk may be provided in sets that are readily assembled and disassembled for temporary installation at conventions and the like, since the auxiliary conveyors 12 and 16 are in the form of easily handable units and the high speed conveyor 14 is composed of elements which lend themselves to standardization and ready assembly and disassembly.

When the low speed conveyors are used level with respect to the high speed conveyor, they are preferably operated at a speed of approximately one and one half miles per hour, allowing the high speed conveyor to be operated at approximately three miles per hour. These speeds are exemplary, however, as other speed relations within the limits hereinbefore referred to may be employed. Suitable power means (not shown) may be employed to drive the respective conveyors. When the low speed conveyors are inclined upwardly or downwardly, as shown in Figure 3 where they rest on inclined ramps 90 positioned on either side of horizontal surface 92, the speeds of the respective conveyors may be varied to compensate for such factors as inertia, momentum, and the like affecting the conveying of passengers. Additionally, the passenger transport surface of the belts 34 and 60 may be roughened to prevent slippage of footing due to the incline.

Referring to Figures 4 and 5, it will be appreciated that since foot guards 48 and 74 are fixed to their respective low speed conveyors, they will be in correct position spanning the gap between the respective conveyor belts in any of the permissible inclined positions of the low speed conveyors with respect to the high speed conveyor.

Passengers board the high speed moving sidewalk 10 by stepping to the receiving end of the low speed loading conveyor 12 from a stationary platform or ramp (not shown) in the direction in which the conveyor 12 is traveling (see the arrow of Figure 1). At the delivering end of conveyor 12, the passengers may step from the passenger support tread of the low speed conveyor 14 in the direction of travel of both conveyors. Resilient strip 52 of foot guard 48 acts as described above to prevent 52 of foot guard 48 acts as described above to prevent shoestrings, trouser cuffs, dress hems, and the like from being drawn between the foot guard and the belt 34. The passenger may also transfer between the conveyors by permitting the belt 34 to push his feet across the smooth, substantially frictionless surface 56a and into contact with belt 18. All surfaces of plate 56 are preferably smoothed off and rounded to avoid the possibility of a passenger's heel catching on same.

At the delivering end of the high speed conveyor 14, the passenger may step from the passenger support tread of the high speed conveyor to the passenger support tread of the conveyor 16 by stepping in the direction which both of the conveyors are traveling, or permit the belt 18 to push his shoes into contact with belt 60. At the other end of the unloading conveyor the passenger steps to a stationary platform or ramp (not shown) by stepping in the direction of movement of the unloading conveyor.

It will be noted that adjustment of pulley 22 for the purpose of applying tension to belt 18 will not disturb the relationship of strip 52 with respect to belt 34. If desired, resilient take-off plate 95, formed of hard rubber or the like (see Figure 1) may be fixed in any suitable manner over the passenger receiving end of conveyor 12 so that this conveyor may be moved longitudinally without disturbing the take-off.

As aforesaid, the elements comprising moving sidewalk 10 are few and simple, and the passenger conveyor therefore lends itself to embodiment into portable, readily installable and removable units, something new in the moving sidewalk art. Since the low speed conveyors are inclinable with respect to the high speed element, required alteration of the installation area adjacent the ends of the moving sidewalk is held to a minimum, while providing maximum operating length for the high speed element.

While the conveyor 10 has been described in connection with the transportation of people, it is readily adapted to the conveying of inanimate objects as well. It is contemplated that it could be employed for material handling purposes.

While the endless belts of moving sidewalk 10 have been shown in the illustrated embodiment as supported by slider plates or beds, it should be distinctly understood that closely spaced steel or rubber rollers may be employed for supporting the travelling belt, particularly in high speed conveyor 14, which ordinarily would be the longest conveyor. Moreover, the safety foot guards 48 and 74 may be employed between relatively fixed adjacent conveyors as well as between angularly adjustable ones, as in the illustrated embodiment. I also contemplate that any number of intermediate speed conveyors may be employed in series at each end of moving sidewalk 10 to increase the speed of operation of the highest speed conveyor.

This application is a continuation-in-part of my application Serial No. 364,861, filed June 29, 1953, and now abandoned in favor of this application.

The foregoing description and the drawings are given merely to explain and illustrate my invention, and the invention is not to be limited thereto, except insofar as the appended claims are so limited, since those skilled in the art who have my disclosure before them will be able to make modifications and variations therein without departing from the scope of the invention.

I claim:

1. A high speed moving sidewalk comprising a high speed endless conveyor trained over spaced apart end pulleys, end frames at the opposite ends of said high-speed conveyor mounted adjacent each end pulley of said conveyor and having pivotal movement about axes coinciding with the axis of rotation of the respective end pulleys, an endless low speed conveyor carried by each of said end frames, and a foot guard fixed to each end frame, movable therewith, and positioned in the gap between the respective low speed conveyors and the ends of the high speed conveyor.

2. A high speed moving sidewalk comprising a slider plate, an end pulley rotatably mounted at each end of said slider plate, a high speed endless conveyor trained over said end pulleys and engaging said slider plate, end frames positioned adjacent each end of said high speed conveyor, said end frames each including a slider plate and a pulley rotatably mounted at each end of the last mentioned slider plate, said end frames being mounted for pivotal movement about an axis coinciding with the axis of rotation of the respective first mentioned end pulleys, a low speed endless conveyor trained over said end pulleys of each end frame, and a resilient foot guard fixed to each end frame and positioned in the gap between the respective low speed conveyors and the ends of the high speed conveyor.

3. An auxiliary low speed conveyor apparatus adapted to be positioned adjacent an end of a high speed endless conveyor comprising a slider plate, head and tail pulleys rotatably mounted at each end of the slider plate, an endless conveyor trained over said pulleys and resting on said slider plate, frame members uniting said slider plate and said pulleys into a unitary frame, said tail pulley being of a relatively small diameter, and a double edged resilient foot guard fixed to said frame at the tail pulley end thereof and in substantial wiping engagement with said second mentioned endless conveyor, said foot guard being interposed between the high speed endless conveyor and said second mentioned endless conveyor when the auxiliary conveyor is positioned adjacent the end of the high speed conveyor.

4. In conveying apparatus including a first endless conveyor, and a second endless conveyor having one end thereof positioned adjacent one end of the first conveyor, the improvement wherein the end pulley of the first conveyor at said one end thereof is relatively large and the end pulley of the second conveyor at said one end thereof is relatively small, wherein said end pulleys are positioned closely adjacent each other, and wherein a stationary landing is positioned in the gap between said ends of the conveyors and substantially fills said gap, said landing comprising a rigid plate mounted in general alignment with the transport surface of said first conveyor and having a resilient edge piece facing said relatively large end pulley and furnishing a sealing edge between the landing and said first conveyor, said edge piece having its upper face inclined upwardly adjacent to said sealing edge and its lower face substantially shaped to the contour of said relatively large end pulley, said edge piece being made of material having frictional characteristics that are substantially equal to or greater than those of the transport surface of said first conveyor.

5. In a passenger transportation system including an endless conveyor having a continuous ribbon belt presenting a relatively smooth transport surface moving in a forward direction around a pulley, and a second endless conveyor having a continuous ribbon belt presenting a relatively smooth transport surface moving in a forward direction around a second pulley, with the forward end of one of the conveyors being positioned adjacent the rearward end of the other conveyor and one of said pulleys having a diameter substantially less than the diameter of the other of said pulleys, the improvement wherein the gap between the said adjacent ends of the conveyors is bridged by a transversely extending strip of rubber-like material fixedly mounted between and overlapping said adjacent ends of the conveyors, said strip including transversely extending relatively pointed sealing edges projecting rearwardly and forwardly over the transport surfaces of the forward and rearward ends respectively of said conveyors in close proximity thereto, with the pointed sealing edges being positioned below the passenger conveying portions of the respective transport surfaces over which they project.

6. A passenger transportation system as set forth in claim 5 in which said sealing edges comprise a material having frictional characteristics substantially equal to or greater than those of the transport surfaces of said first and second conveyors.

7. In a passenger transport conveyor of the type having an endless ribbon belt presenting a relatively smooth transport surface moving in a forward direction toward a landing or continuing conveyor with a safety guard bridging the gap between said belt and the landing or continuing conveyor, the improvement wherein said safety guard comprises a rigid plate mounted in general alignment with said transport surface and having a resilient edge piece facing said transport surface and furnishing a sealing edge, said edge piece having its upper face inclined upwardly adjacent to the sealing edge and its lower face substantially shaped to conform to the contour of the transport surface beneath it, the edge piece being made of a material having frictional characteristics that are substantially equal to or greater than those of the transport surface of said conveyor.

8. In a conveyor system of the type comprising a main conveyor and a contiguous auxiliary conveyor both of the continuous ribbon type with the conveyor belt of the main conveyor passing around a relatively large end pulley and the conveyor belt of the auxiliary conveyor passing around a relatively small end pulley closely spaced to said large pulley and with its top periphery at substantially the same level as the top periphery of the large pulley, the improvement which consists in mounting the small pulley on a supplemental frame which is pivotally mounted for rotation about an axis coincidental with the axis of the large pulley, and a foot guard also mounted on said supplemental frame and spanning the gap between the transport surfaces of the main and auxiliary conveyors, whereby rotation of said supplemental frame about said axis to change the angularity between the main and auxiliary conveyors does not affect the efficacy of the foot guard in spanning the gap between the main conveyor and the auxiliary conveyor.

9. In a passenger transport conveyor of the type having an endless ribbon belt presenting a relatively smooth transport surface moving in a forward direction toward a landing or continuing conveyor with a safety guard bridging the gap between said belt and the landing or continuing conveyor, the improvement wherein said safety guard comprises a rigid plate mounted in general alignment with said transport surface and having a resilient edge piece facing said transport surface and furnishing a sealing edge, said edge piece having its upper face inclined upwardly adjacent to the sealing edge and its lower face substantially shaped to conform to the contour of the transport surface beneath it, the edge piece being made of a material having frictional characteristics that are substantially greater than those of the transport surface of said conveyor.

References Cited in the file of this patent
UNITED STATES PATENTS

| 770,260 | Cahill | Sept. 20, 1904 |
| 886,094 | Urquhart | Apr. 28, 1908 |
| 1,885,892 | Bronander | Nov. 1, 1932 |
| 2,285,321 | Zademach | June 2, 1942 |
| 2,303,684 | Cook | Dec. 1, 1942 |
| 2,536,961 | Smith | Jan. 2, 1951 |

FOREIGN PATENTS

| 828,151 | France | Feb. 7, 1938 |